United States Patent
Coon et al.

(10) Patent No.: US 12,104,659 B2
(45) Date of Patent: *Oct. 1, 2024

(54) FLEXIBLE ARMATURE PLATE FOR AN ELECTRO-MAGNETIC OVERRUNNING CLUTCH

(71) Applicant: The Hilliard Corporation, Elmira, NY (US)

(72) Inventors: William J. Coon, Elmira, NY (US); James E. Palmer, Elmira Heights, NY (US); David C. Ochab, Horseheads, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/769,329

(22) PCT Filed: Sep. 25, 2020

(86) PCT No.: PCT/US2020/052772
§ 371 (c)(1),
(2) Date: Apr. 14, 2022

(87) PCT Pub. No.: WO2021/080731
PCT Pub. Date: Apr. 29, 2021

(65) Prior Publication Data
US 2024/0125361 A1    Apr. 18, 2024

Related U.S. Application Data

(63) Continuation of application No. 16/664,159, filed on Oct. 25, 2019, now Pat. No. 10,989,258.

(51) Int. Cl.
*F16D 27/108*    (2006.01)
*B60K 17/35*    (2006.01)
(Continued)

(52) U.S. Cl.
CPC ........ *F16D 27/108* (2013.01); *B60K 17/3505* (2013.01); *F16D 27/14* (2013.01);
(Continued)

(58) Field of Classification Search
CPC ........ F16D 27/108; F16D 27/14; F16D 27/11; F16D 27/112; F16D 2027/007;
(Continued)

(56) References Cited

U.S. PATENT DOCUMENTS 3,727,736 A    4/1973    Miller et al.
5,031,744 A    7/1991    Nishimura et al.
(Continued)

OTHER PUBLICATIONS

Search Report and Written Opinion for related International Application PCT/US2020/052772 dated Apr. 26, 22, 8 pages.
(Continued)

*Primary Examiner* — Lori Wu
(74) *Attorney, Agent, or Firm* — Faegre Drinker Biddle & Reath LLP

(57) ABSTRACT

An electro-magnetic coil assembly mounted to a clutch assembly, the electromagnetic coil assembly including a coil mounted within an annular coil housing and a flexible armature plate. The coil assembly adapted to generate an electromagnetic field between the coil and the armature plate for attracting the armature plate to the coil assembly. The flexible armature plate includes an annular plate with an outer edge and an inner edge, the outer edge defining an outer periphery, the inner edge defining an inner periphery. Tangs spaced about the inner periphery extending radially inward from the inner edge. Inner notches spaced about the inner periphery of the annular plate and extending radially outward to a point at least halfway in the radial direction
(Continued)

between the inner edge and the outer edge. Outer notches spaced about the outer periphery between and extending radially inward.

24 Claims, 10 Drawing Sheets

(51) Int. Cl.
*F16D 27/14* (2006.01)
*F16D 41/067* (2006.01)
*F16D 41/08* (2006.01)
*F16H 48/24* (2006.01)
*F16H 48/34* (2012.01)
*H01F 7/20* (2006.01)

(52) U.S. Cl.
CPC ......... *F16D 41/067* (2013.01); *F16D 41/088* (2013.01); *F16H 48/24* (2013.01); *F16H 48/34* (2013.01); *H01F 7/20* (2013.01)

(58) Field of Classification Search
CPC .......... F16H 48/24; F16H 48/34; F16H 48/16; B60K 17/3505; H01F 7/20
See application file for complete search history.

(56) References Cited

U.S. PATENT DOCUMENTS

| | | | |
|---|---|---|---|
| 5,971,123 A | 10/1999 | Ochab et al. | |
| 6,194,803 B1 | 2/2001 | Heim | |
| 6,622,837 B2 | 9/2003 | Ochab et al. | |
| 7,276,010 B2 | 10/2007 | Kushino | |
| 7,290,636 B2 | 11/2007 | Murakami et al. | |
| 7,677,375 B2 | 3/2010 | Ando et al. | |
| 7,694,791 B2 | 4/2010 | Kani et al. | |
| 7,717,818 B2 | 5/2010 | Suzuki et al. | |
| 7,815,028 B2 | 10/2010 | Ando et al. | |
| 7,849,988 B2 | 12/2010 | Suzuki et al. | |
| 8,229,640 B2 | 7/2012 | Shigeta et al. | |
| 8,641,575 B2 | 2/2014 | Kokubo | |
| 8,840,514 B1 | 9/2014 | Knickerbocker et al. | |
| 8,857,294 B2 | 10/2014 | Brewer et al. | |
| 9,022,195 B2* | 5/2015 | Heath | F16D 41/088 192/48.92 |
| 9,080,614 B2 | 7/2015 | Tsuda et al. | |
| 9,169,880 B2 | 10/2015 | Nagahama | |
| 9,188,168 B2 | 11/2015 | Ando et al. | |
| 9,360,059 B2* | 6/2016 | Palmer | B60K 17/34 |
| 9,568,050 B2 | 2/2017 | Takeuchi et al. | |
| 10,012,271 B2 | 7/2018 | Yamashita et al. | |
| 10,150,369 B2 | 12/2018 | Thornton et al. | |
| 10,190,667 B2 | 1/2019 | Onitake et al. | |
| 2002/0125095 A1 | 9/2002 | Ochab et al. | |
| 2003/0159901 A1* | 8/2003 | Hayashi | F16D 27/14 192/209 |
| 2012/0133465 A1 | 5/2012 | Staniewicz et al. | |
| 2012/0152686 A1 | 6/2012 | Brewer et al. | |
| 2016/0053829 A1 | 2/2016 | Mogi | |
| 2017/0067516 A1 | 3/2017 | Fujisawa | |
| 2019/0264758 A1* | 8/2019 | Yamada | H02K 1/22 |
| 2019/0345994 A1 | 11/2019 | Geiser | |

OTHER PUBLICATIONS

Extended European Search Report for corresponding application No. 20879649.0 dated Sep. 25, 2023; 7 pages.

* cited by examiner

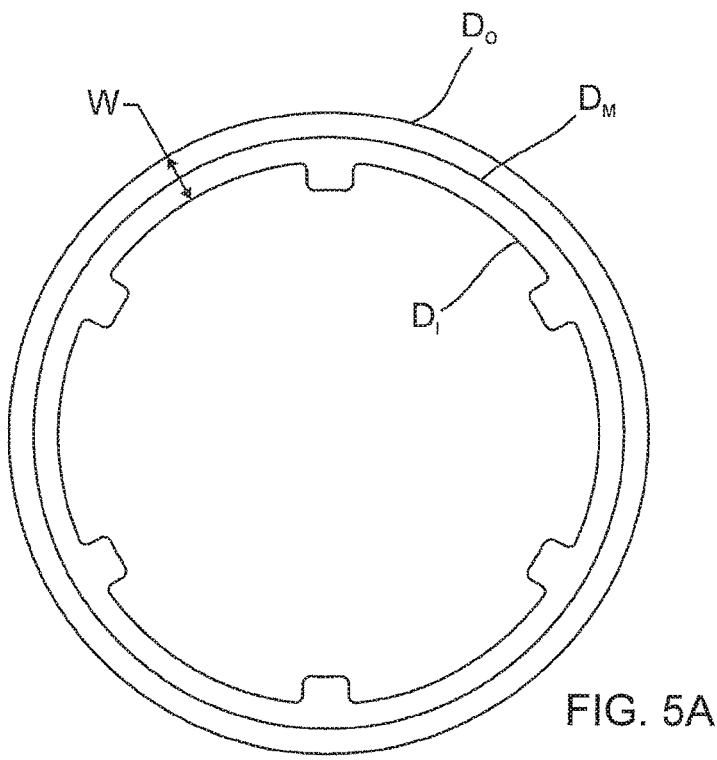 
FIG. 5A
FIG. 5B
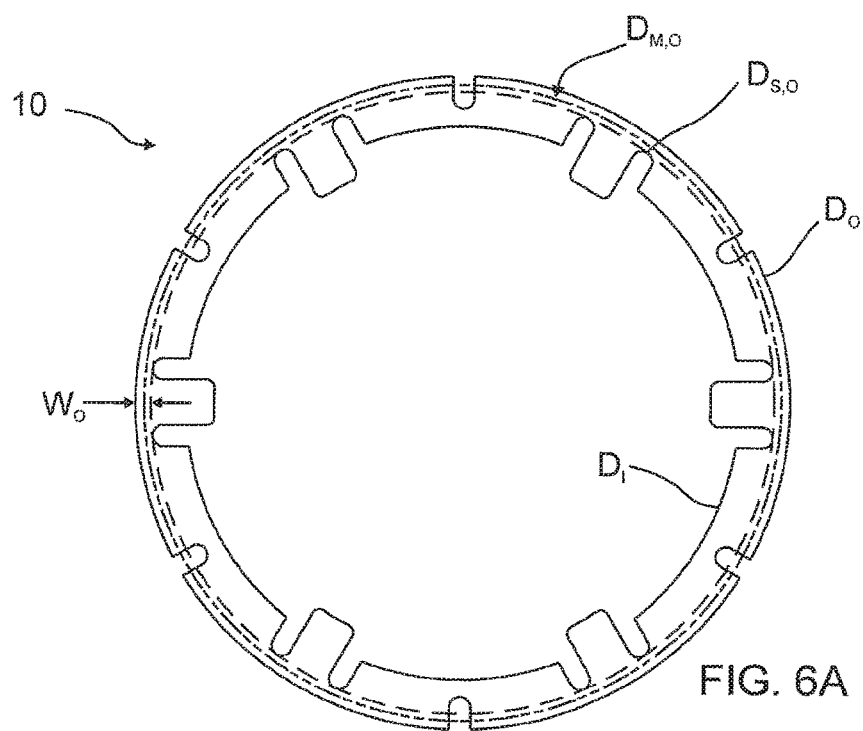 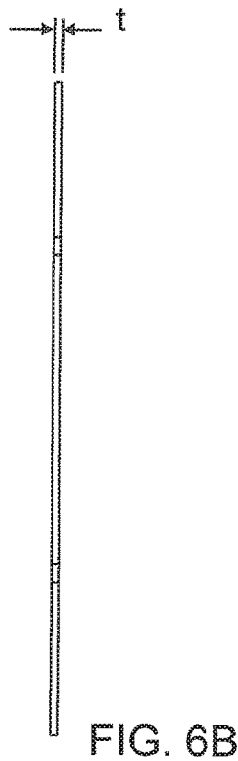
FIG. 6A
FIG. 6B

FLEXIBLE ARMATURE PLATE FOR AN ELECTRO-MAGNETIC OVERRUNNING CLUTCH

FIELD OF THE INVENTION

The present invention relates to clutches and, more particularly, to a flexible armature plate for an electro-magnetic overrunning clutch for providing improved engagement.

BACKGROUND OF THE INVENTION

The increased demand in recent years for off-road and all-terrain vehicles has led to tremendous developments in those types of vehicles. Many of the developments have centered around making the vehicle more adaptable to changing road conditions, e.g., dirt roads, pavement and gravel. As the road terrain changes, it is desirable to vary the driving capabilities of the vehicle to more efficiently navigate the new terrain. Prior four-wheel drive and all-terrain vehicles were cumbersome since they required the operator to manually engage and disengage the secondary drive shaft, e.g., by stopping the vehicle to physically lock/unlock the wheel hubs. Improvements in vehicle drive trains, such as the development of automated systems for engaging and disengaging a driven axle, eliminated many of the problems of the prior designs. These automated drive systems are sometimes referred to as "on-the-fly" four wheel drive.

Generally, all four-wheel drive vehicles include a differential for transferring torque from a drive shaft to the driven shafts that are attached to the wheels. Typically, the driven shafts (or half shafts) are independent of one another allowing differential action to occur when one wheel attempts to rotate at a different speed than the other, for example when the vehicle turns. The differential action also eliminates tire scrubbing, reduces transmission loads and reduces understeering during cornering (the tendency to go straight in a corner).

Many differentials on the market today use some form of an overrunning clutch to transmit torque when needed to a driven shaft. One successful use of an overrunning clutch in an all-terrain vehicle is disclosed in U.S. Pat. Nos. 5,971,123 and 8,840,514, both commonly owned by the assignee of the present invention and incorporated herein by reference in their entireties. In those patents, the vehicle incorporates an overrunning clutch that uses one or more electromagnetic devices for controlling engagement and/or engine braking of the four wheel drive mechanism. Specifically, an electrically controlled coil is used to generate a magnetic field which causes an armature plate to advance and/or retard a roll cage, thereby controlling the ability of the differential to engage and disengage depending on the operational state of the primary and secondary wheels.

One of the difficulties with use of an electromagnet and armature plate system is the need for the armature plate to be extremely flat. More particularly and with reference to FIGS. 1A and 1B, the electromagnetic engagement device includes an electromagnetic coil 2 mounted within a coil housing 1, and an armature plate 3 engaged with a roll cage (not shown) that rotates with the roll cage. The armature plate 3 and the electromagnet are both formed as annular rings that, in order to function efficiently, must have maximum surface area contact between the two when the coil is energized, therefore having no air gaps between the two. In the event that the armature plate 3 is warped or bent, as shown by portion 3A in FIGS. 1A and 1B, such that it is not substantially flat, then when the coil 2 is energized only portions of the armature plate 3 are drawn into contact with the face of the electromagnet (shown in FIG. 1B and as shaded portions 3B in FIG. 1C), resulting in gaps 4A forming between the electromagnet and the armature plate 3.

Since the ability of the electromagnetic engagement device to transmit torque is a function of the surface contact and air gap between the electromagnet and the armature plate 3, it is necessary in conventional systems to incorporate costly manufacturing processes for making sure the armature plate 3 is substantially flat, such as coining, sanding, or grinding processes.

A need therefore exists for an improved electromagnetic engagement device which eliminates or reduces the need for these flattening procedures.

SUMMARY OF THE INVENTION

An electro-magnetic coil assembly is disclosed which is mounted in a clutch assembly, the electromagnetic coil assembly includes a coil mounted within an annular coil housing and a flexible armature plate, The coil assembly is adapted to, when energized, generate an electromagnetic field between the coil and the armature plate for attracting the armature plate to the coil assembly, The flexible armature plate includes an annular plate with an outer edge and an inner edge, the outer edge being spaced apart from the inner edge and defining a plate width therebetween, the outer edge defining an outer periphery, the inner edge defining an inner periphery.

A plurality of tangs are formed on and spaced about the inner periphery. In one embodiment, the tangs extend radially inward from the inner edge.

A plurality of inner notches are formed on and spaced about the inner periphery of the annular plate. At least two of the inner notches are located between each set of adjacent tangs and extend radially outward from the inner edge to a point at least halfway in the radial direction between the inner edge and the outer edge.

A plurality of outer notches are formed on and spaced about the outer periphery of the annular plate. At least one of the outer notches is located between each set of adjacent tangs and extends radially inward from the outer edge to a point at least halfway in the radial direction between the outer edge and the inner edge.

In an embodiment, the coil is preferably a bobbin of wire wound about a plastic base and connected to a wire for supplying power. The coil may, in an embodiment, be wound wire and encapsulated in plastic and connected to a wire for supplying power.

The tangs are preferably spaced equidistant from each other.

Each inner notch is preferably adjacent to a respective tang such that an edge of the tang defines a radial edge of the inner notch.

The outer edge may be substantially circular in shape.

The inner edge may be substantially circular in shape except where the tangs protrude radially inward, and the inner notch extends radially outward at least 50% of the radial width.

The armature plate may include at least one outer notch located between each set of adjacent tangs, the outer notch extending radially inward from the outer edge. In one embodiment there is one outer notch located equidistant between each set of adjacent tangs and the outer notch extends radially inward from the edge at least halfway between the outer edge and the inner edge. In an embodiment, the outer notch extends radially inward from the outer edge at least 50% of the radial width.

A bi-directional overrunning clutch assembly is disclosed for engaging driven shafts in a four wheel drive vehicle. The clutch assembly includes the electro-magnetic coil assembly. The clutch assembly includes: a differential housing with a differential case; a pinion input gear rotatably disposed within case and including a shaft extending out from the case and adapted to engage a drive shaft, the pinion input gear rotatable within the case; a ring gear located within the differential case and engaged with the pinion input gear such that rotation of the pinion input gear produces rotation of the ring gear; and a bi-directional overrunning clutch housing is formed on or attached to the ring gear such that rotation of the ring gear produces corresponding rotation of the clutch housing.

The clutch housing has an internal diameter with a contoured surface. A pair of hubs are substantially coaxially aligned with each other and located within the clutch housing, each hub adapted to engage an end of a driven shaft. A roll cage assembly is located within the clutch housing and includes a roll cage with two sets of rolls, each roll disposed within a slot formed in the roll cage. The rolls are spaced around the circumference of the cage. A plurality of springs are provided for positioning the rolls in the slots. One set of rolls is located between a portion of the contoured surface of the clutch housing and an outer surface of one hub, and the other set of rolls is located between a portion of the contoured surface of the clutch housing and an outer surface of the other hub.

The clutch assembly includes an electromagnetic system for indexing the roll cage relative to the clutch housing. The electromagnetic system includes the electro-magnetic coil assembly. The tangs are engaged with the roll cage. When the coil is activated, the armature plate causes the roll cage to index in a first direction relative to the clutch housing so as to index the roll cage into an active drive state where the rolls are positioned to cause the drive shaft to be coupled to the driven shafts when four wheel drive is needed.

An electro-magnetic coil assembly is disclosed mounted in a clutch assembly. The electromagnetic coil assembly comprises a coil mounted within an annular coil housing and a flexible armature plate, the coil assembly is adapted, when energized, to generate an electromagnetic field between the coil and the armature plate for attracting the armature plate to the coil assembly. The flexible armature plate includes an annular plate with an outer edge and an inner edge, the outer edge being spaced apart from the inner edge and defining a plate width therebetween, the outer edge defining an outer periphery, the inner edge defining an inner periphery.

A plurality of the tangs are formed on and spaced about the outer periphery, the tangs extending radially outward from the outer edge. A plurality of outer notches are formed on and spaced about the outer periphery of the annular plate. At least two of the outer notches are located between each set of adjacent tangs and extend radially inward from the outer edge to a point at least halfway in the radial direction between the outer edge and the inner edge.

A plurality of inner notches are formed on and spaced about the inner periphery of the annular plate. At least one of the inner notches is located between each set of adjacent tangs and extends radially outward from the inner edge to a point at least halfway in the radial direction between the inner edge and the outer edge.

In an embodiment, the coil is a bobbin of wire wound about a plastic base and connected to a wire for supplying power.

In an embodiment, the coil is wound wire and encapsulated in plastic and connected to a wire for supplying power.

The tangs are preferably spaced equidistant from each other.

In an embodiment, each outer notch is adjacent to a respective tang such that an edge of the tang defines a radial edge of the outer notch.

The inner edge may be substantially circular in shape.

The outer edge may be substantially circular in shape except where the tangs protrude radially outward, and the outer notches extend radially inward at least about 50% of the radial width.

In an of the above embodiments, the armature plate includes one inner notch located between each set of adjacent tangs, the inner notch extending radially outward from the inner edge. In an embodiment, the inner notch is located equidistant between each set of adjacent tangs and the inner notch extends radially outward from the edge at least halfway between the inner edge and the outer edge. In an embodiment, the inner notch extends radially outward from the inner edge at least 50% of the radial width.

In an embodiment, a bi-directional overrunning clutch assembly is disclosed for engaging driven shafts in a four wheel drive vehicle. The clutch assembly includes the electro-magnetic coil assembly disclosed in any of the above embodiments or combinations thereof. The clutch assembly includes a differential housing including a differential case; a pinion input gear rotatably disposed within case and includes a shaft extending out from the case and adapted to engage a drive shaft, the pinion input gear is rotatable within the case. A ring gear is located within the differential case and engaged with the pinion input gear such that rotation of the pinion input gear produces rotation of the ring gear.

A clutch housing is formed on or attached to the ring gear such that rotation of the ring gear produces corresponding rotation of the clutch housing. The clutch housing has an internal diameter with a contoured surface. A pair of hubs are substantially coaxially aligned with each other and located within the clutch housing, each hub adapted to engage an end of a driven shaft. A roll cage assembly is located within the clutch housing and includes a roll cage with two sets of rolls, each roll disposed within a slot formed in the roll cage. The rolls are spaced around the circumference of the cage A plurality of springs are included for positioning the rolls in the slots. One set of rolls is located between a portion of the contoured surface of the clutch housing and an outer surface of one hub, and the other set of rolls is located between a portion of the contoured surface of the clutch housing and an outer surface of the other hub.

An electromagnetic system is included for indexing the roll cage relative to the clutch housing. The electromagnetic system includes the electro-magnetic coil assembly. The tangs are engaged with the roll cage such that when the coil is activated, the armature plate causes the roll cage to index in a first direction relative to the clutch housing so as to index the roll cage into an active drive state where the rolls are positioned to cause the drive shaft to be coupled to the driven shafts when four wheel drive is needed.

In another embodiment, a bi-directional overrunning clutch mechanism is disclosed for controlling torque transmission between an input shaft and at least one output hub, the clutch mechanism including the electro-magnetic coil assembly disclosed in any of the above embodiments or combinations thereof. The clutch mechanism includes a mechanism housing; an input shaft having an end rotatably disposed within the mechanism housing; at least one output hub, at least a portion of the output hub being rotatably disposed within the mechanism housing, the hub having an outer surface; and a clutch disposed within the mechanism housing and adapted to control torque transmission between the input shaft and the at least one output hub.

The clutch includes a clutch housing engaged with the end of the input shaft in the mechanism housing so as to permit transmission of rotational motion from the input shaft to the clutch housing, the clutch housing having an inner surface with a cam surface formed thereon, the end of the hub being located radially inward from the cam surface. A roll cage is located between the cam surface and the end of the hub, the roll cage having a plurality of slots formed in and spaced circumferentially about the roll cage, each slot having a roll located therein. The cage is rotatable relative to the clutch housing and the end of the hub. The roll cage has a first position where the roll cage is positioned relative to the clutch housing such that a plurality of the rolls are not engaged with at least one of either the inner surface of the clutch housing or the outer surface of the hub so that substantially no torque can transfer from the clutch housing to the hub through the rolls, and a second position where the roll cage is positioned relative to the clutch housing such that a plurality of the rolls are engaged with the inner surface of the clutch housing and the outer surface of the hub so as to permit torque transfer between the clutch housing and the hub.

An engagement control assembly is included in the clutch mechanism and has a drag mechanism which engages the roll cage to shift the roll cage into its second position, the drag mechanism including the electro-magnetic coil assembly for controllably rotating the roll cage relative to the clutch housing. The armature plate is engaged to the roll cage such that energizing of the coil assembly causes the armature plate to shift the roll cage. A spring is mounted to the clutch housing and engaged with the armature plate for biasing the roll cage into its first position. The engagement control assembly includes an adapter disposed about at least a portion of the roll cage and engaged with the roll cage through the drag mechanism such that as the drag mechanism rotates the roll cage, it rotates the adapter. One end of the spring is in biasing engagement with a portion of the adapter such that rotation of the roll cage and adapter stretches or compresses the spring such that the spring applies a biasing force against the adapter urging it to rotate in the opposite direction.

In another embodiment, a bi-directional overrunning clutch mechanism is disclosed for controlling torque transmission between an input shaft and at least one output hub. The clutch mechanism includes the clutch housing and electro-magnetic coil assembly described in any one or more of the above embodiments or combinations thereof. The clutch mechanism includes a mechanism housing; an input shaft having an end rotatably disposed within the mechanism housing; at least one output hub, where at least a portion of the output hub is rotatably disposed within the mechanism housing, the hub having an outer surface; and a clutch disposed within the mechanism housing and adapted to control torque transmission between the input shaft and the at least one output hub.

The clutch includes the clutch housing which is engaged with an end of the input shaft in the mechanism housing so as to permit transmission of rotational motion from the input shaft to the clutch housing. The clutch housing has an inner surface with a cam surface formed thereon, the end of the hub being located radially inward from the cam surface. A roll cage is located between the cam surface and the end of the hub, the roll cage having a plurality of slots formed in and spaced circumferentially about the roll cage, each slot having a roll located therein. The cage being rotatable relative to the clutch housing and the end of the hub. The roll cage having a first position where the roll cage is positioned relative to the clutch housing such that a plurality of the rolls are not engaged with at least one of either the inner surface of the clutch housing or the outer surface of the hub so that substantially no torque can transfer from the clutch housing to the hub through the rolls, and a second position where the roll cage is positioned relative to the clutch housing such that a plurality of the rolls are engaged with the inner surface of the clutch housing and the outer surface of the hub so as to permit torque transfer between the clutch housing and the hub.

An engagement control assembly is provided that includes a drag mechanism which engages the roll cage to shift the roll cage into its second position. The drag mechanism includes the electro-magnetic coil assembly for controllably rotating the roll cage relative to the clutch housing. The armature plate is engaged to the roll cage such that energizing of the coil assembly causes the armature plate to shift the roll cage. A spring is mounted to the clutch housing and engaged with the armature plate for biasing the roll cage into its first position. The engagement control assembly includes an adapter disposed about at least a portion of the roll cage and engaged with the roll cage through the drag mechanism such that as the drag mechanism rotates the roll cage, it rotates the adapter. One end of the spring is in biasing engagement with a portion of the adapter such that rotation of the roll cage and adapter stretches or compresses the spring such that the spring applies a biasing force against the adapter urging it to rotate in the opposite direction.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive. It is specifically contemplated that any one or more of the claims may be combined with any other claims.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 5A is a front view and FIG. 5B is a side view of a conventional armature plate in FIG. 1C.

FIG. 6A is a front view and FIG. 6B is a side view of the armature plate of the present invention shown in FIG. 2.

DETAILED DESCRIPTION OF THE EMBODIMENTS

Figure 2:
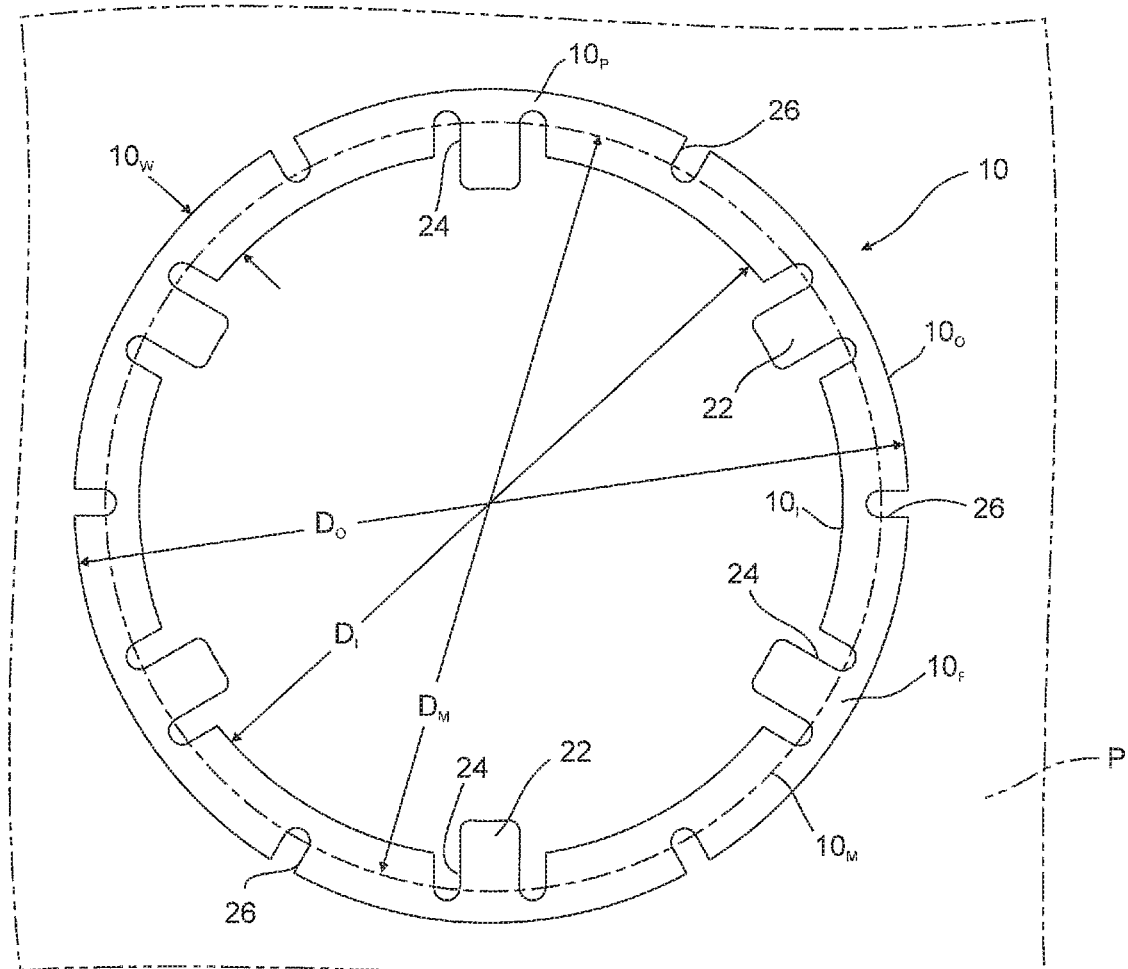
FIG. 2 is a front view of an armature plate according to the present invention.
Figure 3:
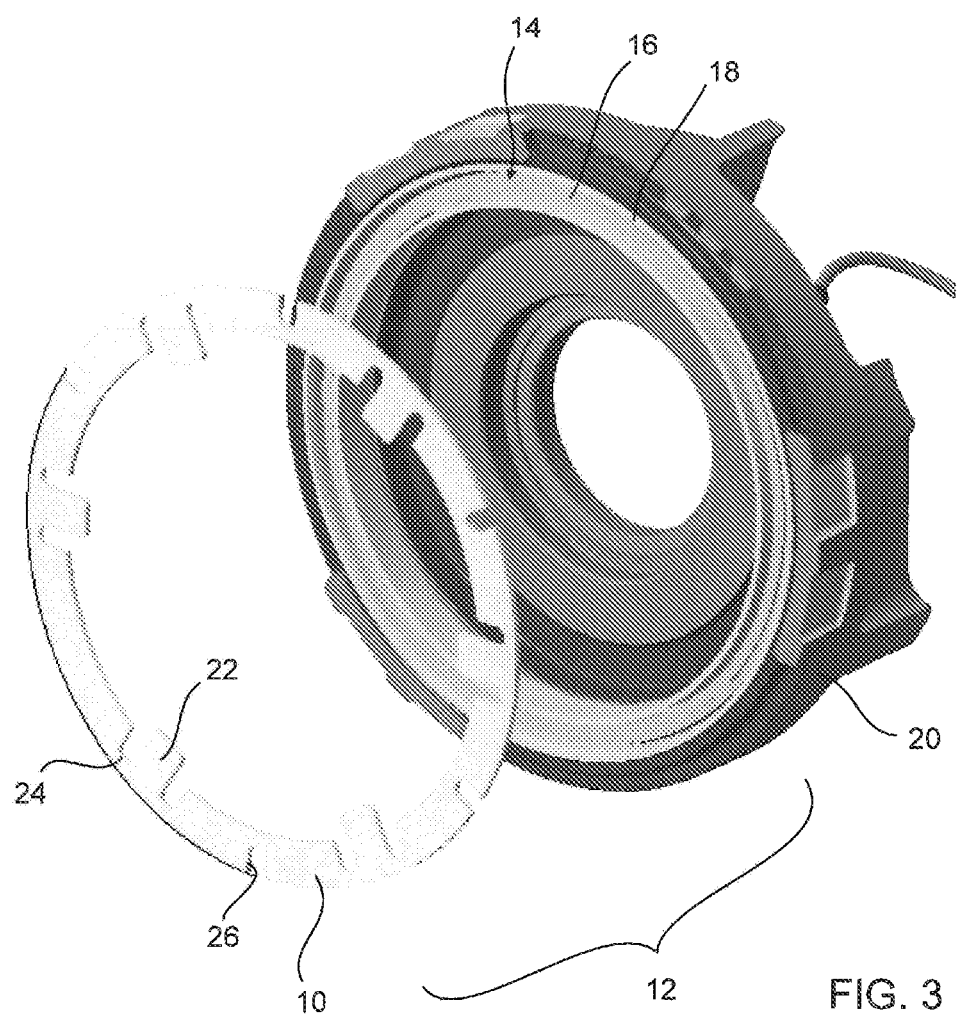
FIG. 3 is an exploded perspective view of one embodiment of an electromagnetic engagement device with the armature plate of FIG. 2.
Figure 4A:
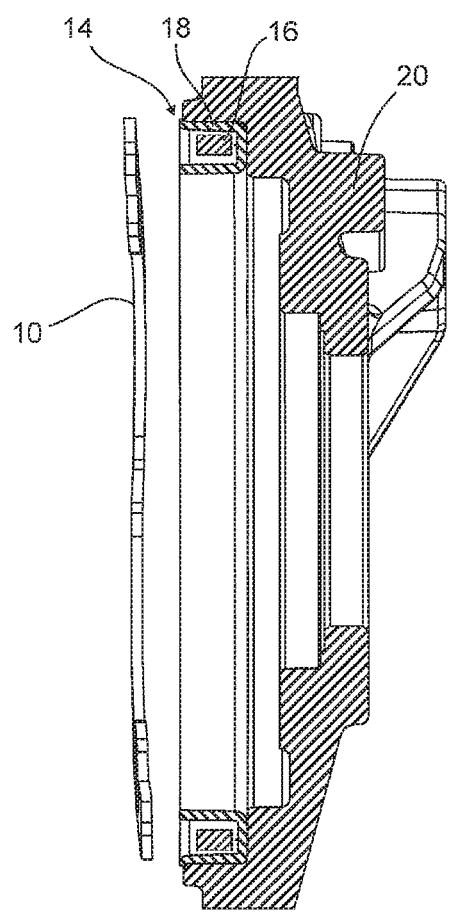
FIG. 4A is a side view of the electromagnetic engagement device of FIG. 3, with the armature plate in FIG. 2 when the electromagnetic engagement device is not activated.
Figure 4B:
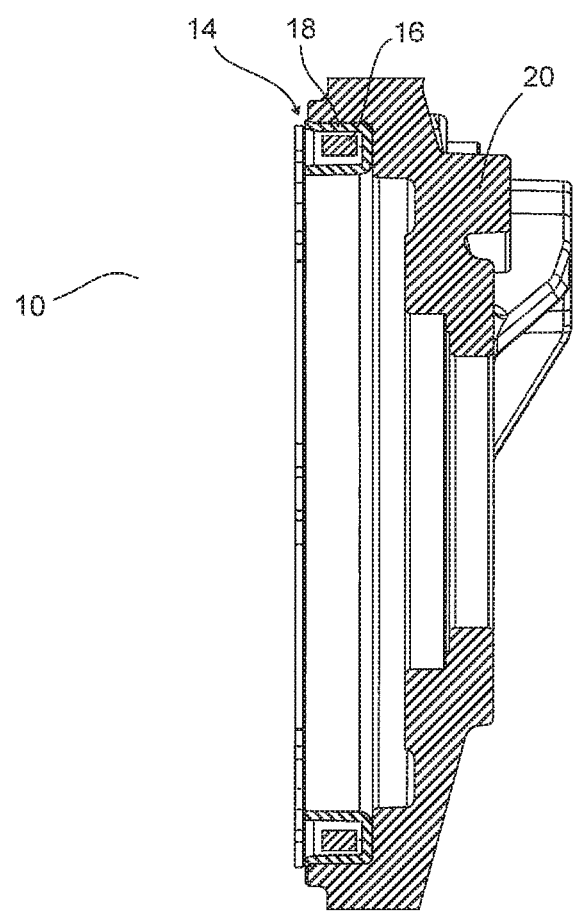
FIG. 4B is a side view of the electromagnetic engagement device of FIG. 3 when the electromagnetic engagement device is activated.

Referring now to the drawings, wherein like reference numerals illustrate corresponding or similar elements throughout the several views, FIG. 2 is a front view of an armature plate 10 according to the present invention. The armature plate 10 is part of an electromagnetic engagement device 12, that is preferably part of a bi-directional overrunning clutch assembly in a vehicle drive system. The drive system includes a transmission, a primary drive shaft, a primary differential, and first and second primary driven shafts which drive primary wheels. The drive system also includes a secondary drive shaft which may be rotatably connected to the bi-directional overrunning clutch assembly through any conventional means known to those skilled in the art, such as a splined connection. The bi-directional overrunning clutch assembly, in turn, rotatably drives two secondary driven shafts which are attached to secondary wheels.

The details of one embodiment of the bi-directional overrunning clutch assembly are described in U.S. Pat. No. 8,840,514, however those skilled in the art would be readily capable of incorporating a flexible armature plate according to the present invention into other electromagnetic engagement devices in light of the teachings provided herein. In one preferred embodiment, the bi-directional overrunning clutch assembly, includes a differential housing including a cover mounted to a differential gear case. An input gear is rotatably disposed within case. A shaft of the pinion input gear extends out from an opening in the case and is adapted to attach to a drive shaft. The input gear engages with a ring gear located within the differential case.

The ring gear is preferably formed integral with or attached to a clutch housing. The clutch housing includes an internal diameter with a contour or cam surface. A roller cage assembly is located within the clutch housing and includes a roll cage with a plurality of rolls rotatably disposed within slots in cage. More specifically, the roll cage preferably includes two independent sets of rolls disposed within two sets of slots formed in the roll cage around its circumference. The roll cage assembly preferably includes a plurality of springs, such as spring clips, for positioning the rolls in the center of the slots. U.S. Pat. Nos. 6,629,590, 6,622,837 and 6,722,484, which are incorporated herein by reference in their entirety, disclose spring arrangements and roll cage assemblies that can be used in the present invention.

Each set of rolls is located adjacent to the inner cam surface of the clutch housing. In one configuration, the contour of the cam surface is configured with a plurality of peaks and valleys. When the roll cage is located within the clutch housing and the clutch is not activated, the rolls are located within the valleys with the cam surface tapering toward the cage on either side of the roll. The cam surface and rolls provide the bi-directional overrunning capabilities as described in detail in U.S. Pat. Nos. 6,629,590, 6,622,837 and 6,722,484. Cam surfaces and roll cages in overrunning clutches are well known in the art. Hence, a detailed discussion of these features is not needed.

There are two hubs with a portion of each hub located radially inward of the roll cage. Each hub portion is adjacent to one of the sets of rolls such that the outer surface of the portion of each hub contacts a set of rolls. As is well understood in the art, the contact between the rolls, the clutch housing and the hubs transfer rotation (and torque) between the clutch housing and the axles. Each hub is engaged with a corresponding axle through any conventional means designed to transfer torque from the hub to the axle.

In order to activate the overrunning clutch and thereby make the vehicle capable of engaging in four wheel drive and/or engine braking, the present invention preferably incorporates an electromagnetic system. More specifically, the present invention includes at least one or more roll cage adjustment device or electromagnetic indexing device which is electrically connected to an electronic control system. The indexing device preferably includes an electromagnetic coil assembly. In one embodiment, there is a first indexing device (e.g., a first electronic or electromagnetic drive activation device or electromagnetic drive coil assembly) that is configured, when activated, to cause the roll cage to index into an active drive state (i.e., four wheel drive capability) where the rolls are positioned to cause the secondary drive shaft be coupled to the secondary driven shafts when four wheel drive is needed.

A second indexing device (e.g., a second electromagnetic backdrive activation device or electromagnetic backdrive coil assembly) may be included and is configured, when activated, to cause the roll cage to index into an active backdrive state (i.e., engine breaking capability) where the rolls are positioned to cause the secondary driven shafts to be coupled to the secondary drive shaft for providing torque transfer from the secondary driven shafts to the secondary drive shaft during an engine braking condition. These systems are described in detail in the prior systems discussed above.

Each electromagnetic indexing device includes a coil assembly 14 that includes a coil 16 in an annular steel coil pocket or housing 18 and the armature plate 10, which are configured to control retarding or indexing of the applicable roll cage with respect to the clutch housing (not shown). The coil assembly 14 is mounted to the differential housing 20 in close proximity to the armature plate 10. The drive coil assembly 14 is preferably annular in shape with a central axis coincident with the axis of rotation of the roll cage. The coil 16 is preferably an encapsulated wound coil which includes a plastic base about which the coil is housed. Suitable coils for use in the present invention are well known to those skilled in the electric clutch art. The coil assembly 14 is preferably bonded or otherwise attached to the differential housing 20.

The armature plate 10 is preferably annular in shape and made from a ferromagnetic material, and is free to rotate with respect to the coil assembly 14 when the coil is not energized. The armature plate 10 includes at least one, and more preferably, a plurality of tangs or fingers 22 which protrude radially inward from the annular portion of the armature plate 10 toward the rotational axis of the roll cage. The tangs 22 engage with the roll cage such that the armature plate rotates with the roll cage when the coil assembly 14 is not energized.

When the coil assembly is energized, an electromagnetic field is generated between the drive coil assembly 14 and the armature plate 10 attracting the armature plate 10 to the drive coil assembly 14, thus causing the armature plate 10 to try to remain stationary. Since the armature plate 10 is engaged with the roll cage by the tangs 22, when the roll cage rotates the magnetic force causes the armature plate 10 to drag which, in turn, causes the roll cage to also drag or retard.

The coil 16 is connected to an electronic control system, such as a signal processor or manually activated electrical system, for controlling the energizing of (supplying power to) the coil 16. Other types of control systems can also be used in the present invention.

As discussed above, the drive system may include a second indexing device with a backdrive coil assembly. The backdrive coil assembly is preferably similar to the drive coil assembly and is annular in shape with a central axis coincident with the axis of rotation of the roll cage. The backdrive coil assembly includes a coil and armature plate similar to the ones described above, and is further described in U.S. Pat. No. 8,840,514. The control system is preferably configured to shut off (deactivate) the first indexing system when second indexing system is activated so as to prevent the two indexing systems from being activated at the same time and fighting each other to index the armature plate in opposite directions. This, however, is not needed in all applications, for example if the second indexing system provides significantly higher drag than the first indexing system.

Referring to FIG. 2, the armature plate 10 is configured to be flexible in and out of a plane P upon which the face $10_F$ of the plate lies. More specifically, the armature plate 10 has an outer diameter or edge $10_O$ and an inner diameter or edge $10_I$. There are a plurality of the tangs 22 extending radially inward from the inner diameter $10_I$. As should be apparent, the use of the terms "outer diameter" and "inner diameter" are used to refer to the edges in a preferred circular shape. However the shape of the armature plate need not be circular, although circular is preferred for balance. On each side of a tang 22 is an inner notch 24, preferably in close proximity to, or more preferably adjacent to the tang 22 such that, instead of the tangs 22 terminating at the inner diameter $10_I$, the tangs extend radially outward to at least about the armature plate's median diameter $10_M$. The median diameter or line $10_M$ is the location at the mid-point between the outer diameter or edge $10_O$ and inner diameter or edge $10_I$. Thus, as should be apparent from FIG. 2, the material or portion $10_P$ of the armature plate 10 that the tang 22 is immediately attached to is no larger than half of the radial width $10_W$ of the armature plate 10 at that point. In a preferred embodiment, the inner notch 24 extends radially outward at least about 50% to 85% of the radial width $10_W$. This permits the tangs 22 as well as the plate sections between the tangs to flex into and out of the plane P as forces are applied to it. Forces such as those from the electromagnet.

The armature plate 10 also preferably includes at least one outer notch 26 located between adjacent tangs 22. Preferably the outer notch 26 extends radially inward from the outer diameter $10_O$ at least 50% to 85% of the radial width $10_W$.

The incorporation of flexure points (i.e., at the location of the notches 24, 26) in the armature plate 10 permits the armature plate to flex so as to lie substantially flat against the face of the coil 16 and remove air gaps when the coil is activated. This results in increased ability to transfer loads between the roll cage and the drive coil assembly 14.

In addition, the flexure points provide the added ability to facilitate disengagement of the armature plate 10 from the face of the coil 16. Specifically, the magnetic force has a hysteresis effect that is inherent after the coil is deactivated, i.e., the magnetic flux in the armature plate 10 takes time to dissipate. By permitting the armature plate 10 to flex, any bends or warpage will produce a spring force that will assist with separation of the armature plate from the face of the coil.

Figure 1A:
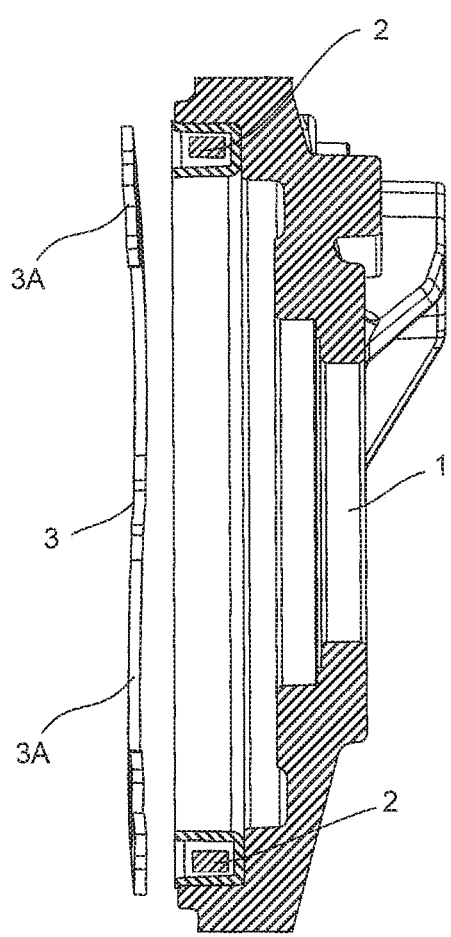
FIGS. 1A and 1B are side views illustrating the problems of a warped conventional armature plate in an electromagnetic engagement device.
Figure 1B:
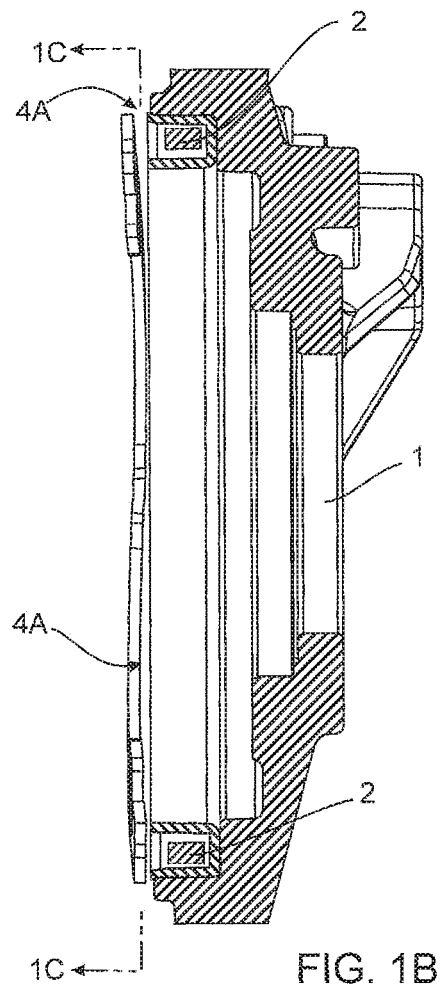
Figure 1C:
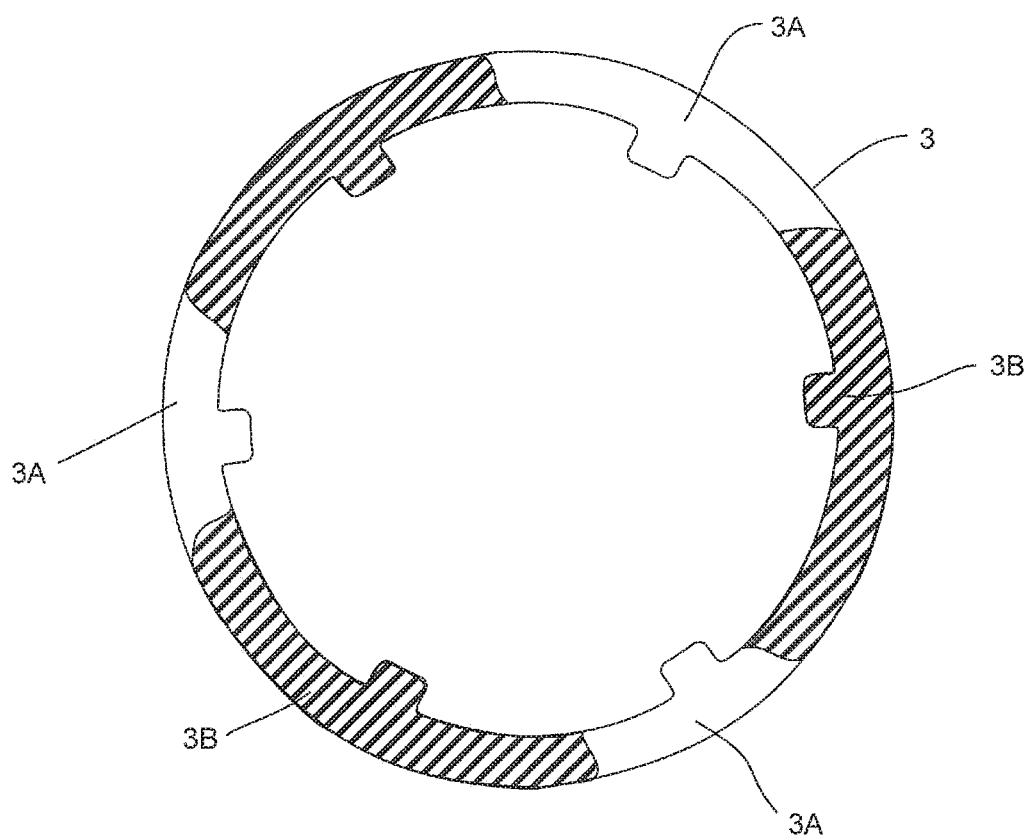
FIG. 1C is a front view of a conventional armature plate viewed along lines 1C-1C in FIG. 1B.

Increased flexure in the plate is fully understood when spring design theory is applied to those areas. The mathematical relationship between flexibility and the geometry for the armature plate 3 shown in FIG. 1C (and FIGS. 5A, 5B) and the armature plate 10 shown in FIG. 2 (and FIGS. 6A, 6B) is derived from springs that contain a not flat, waved or dished geometry. Armature plates 3 and 10 were manufactured and deformed in a similar manner so as to only sit on points when resting on the electromagnet. The flexibility of the conventional armature plate 3 was determined using the formula 1:

$$f_3 = \frac{(2.4D_M^3 P)}{EWt^3 N_a^4 \left(\frac{D_O}{D_I}\right)} \quad \text{Formula 1}$$

The flexibility of the armature plate 10 according to the present invention was determined using the formula 2:

$$f_{10} = \frac{(2.4D_{M,O}^3 P)}{EW_O t^3 N_a^4 \left(\frac{D_O}{D_{S,O}}\right)} \quad \text{Formula 2}$$

Figure 7:
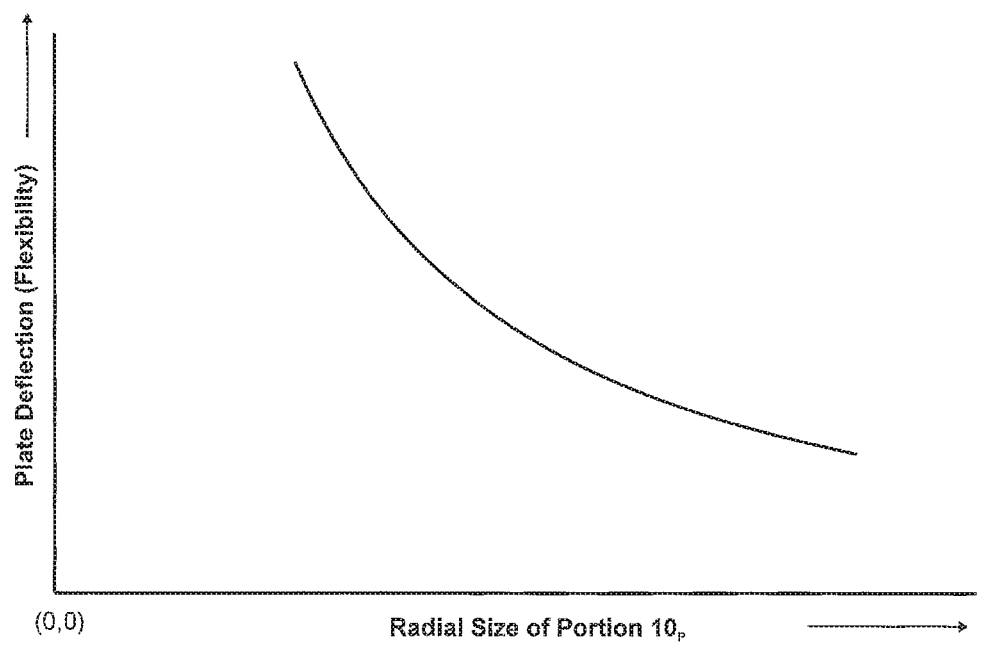
FIG. 7 is a chart illustrating the relationship between the plate flexibility and the width of the armature plate adjacent to the tabs.

Referring to FIG. 7, the chart shows the importance and advantage of keeping portion $10_P$ small to get greater flexibility. When the geometry of armature plate 3 is compared to armature 10 it is apparent that the large difference in $10_P$ would cause a stiff, less flexible armature plate 3. The variables $D_{M,O}$, $W_O$, and $D_{S,O}$ all relate to portion $10_P$ and $10_W$. These along with plate thickness, t, are key features in flexible design. The optimization of these variables by adding unique notches to produce flexible portions has proven to create a superior invention.

While one preferred embodiment of the invention has been described with coils and armature plates as the roll cage adjustment devices, as discussed above, those skilled in the art, in light of the teachings provided herein, would understand how to modify the invention to incorporate other electrically controlled assemblies, such as mechanical, electrical, hydraulic or pneumatic devices in place of the coils and/or armature plates as components in the indexing devices.

As should be apparent from the above description, the present invention provides an innovate bi-directional overrunning clutch assembly that is useful in a switchable four-wheel drive system (i.e., a system that can be switched from a two-wheel drive system to a four-wheel drive system depending on need.) Also, the present invention has applicability for controlling drive and driven shafts in other assemblies. For example, in a transmission, the present invention could be used to control torque transfer (turn on and off) the front or rear drive shaft. The present invention could also be used as a 4×4 disconnect and still have the ability to engine brake. In this set up, the system would only require use of the second indexing system with the second armature plate and hub plate, without need for the first indexing system. Similarly, if the present invention is used as a primary drive system, where torque is continuously driven to the primary drive shafts, the present invention could be used within the first indexing system.

Figure 8:
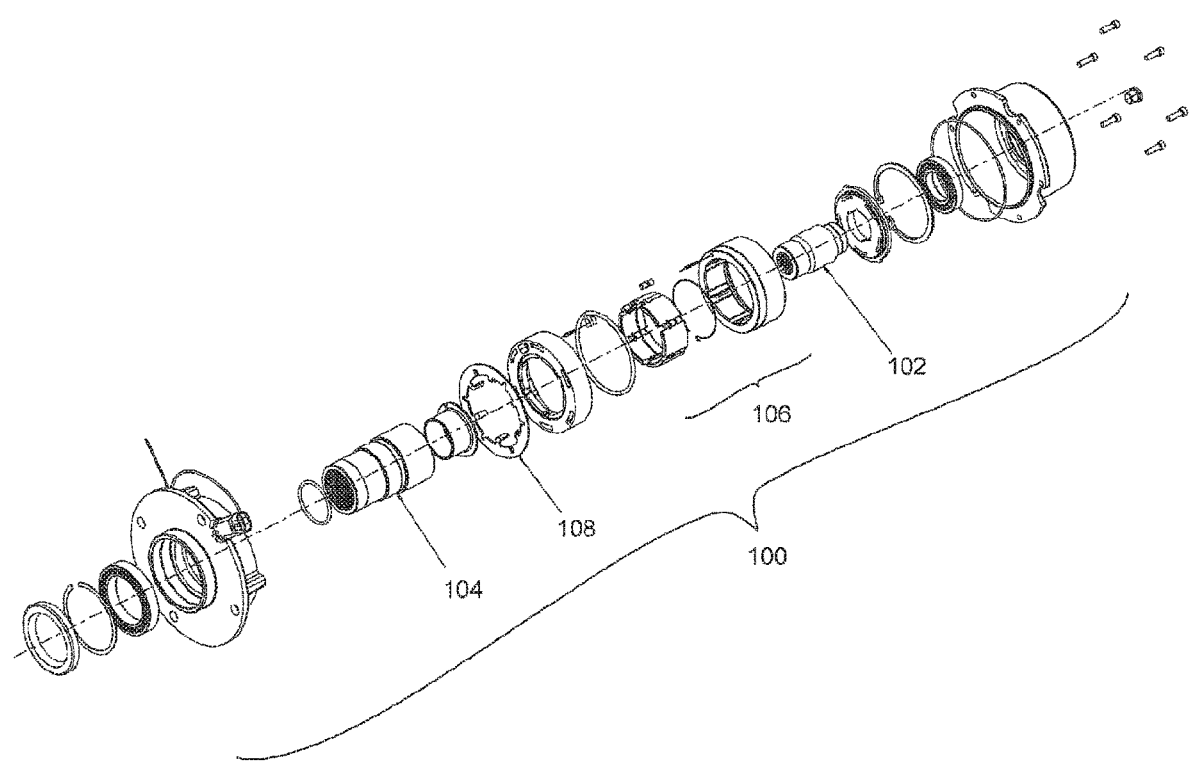
FIG. 8 is an exploded view of a bidirectional coupling with an electromagnetic engagement device according to the present invention.
Figure 9:
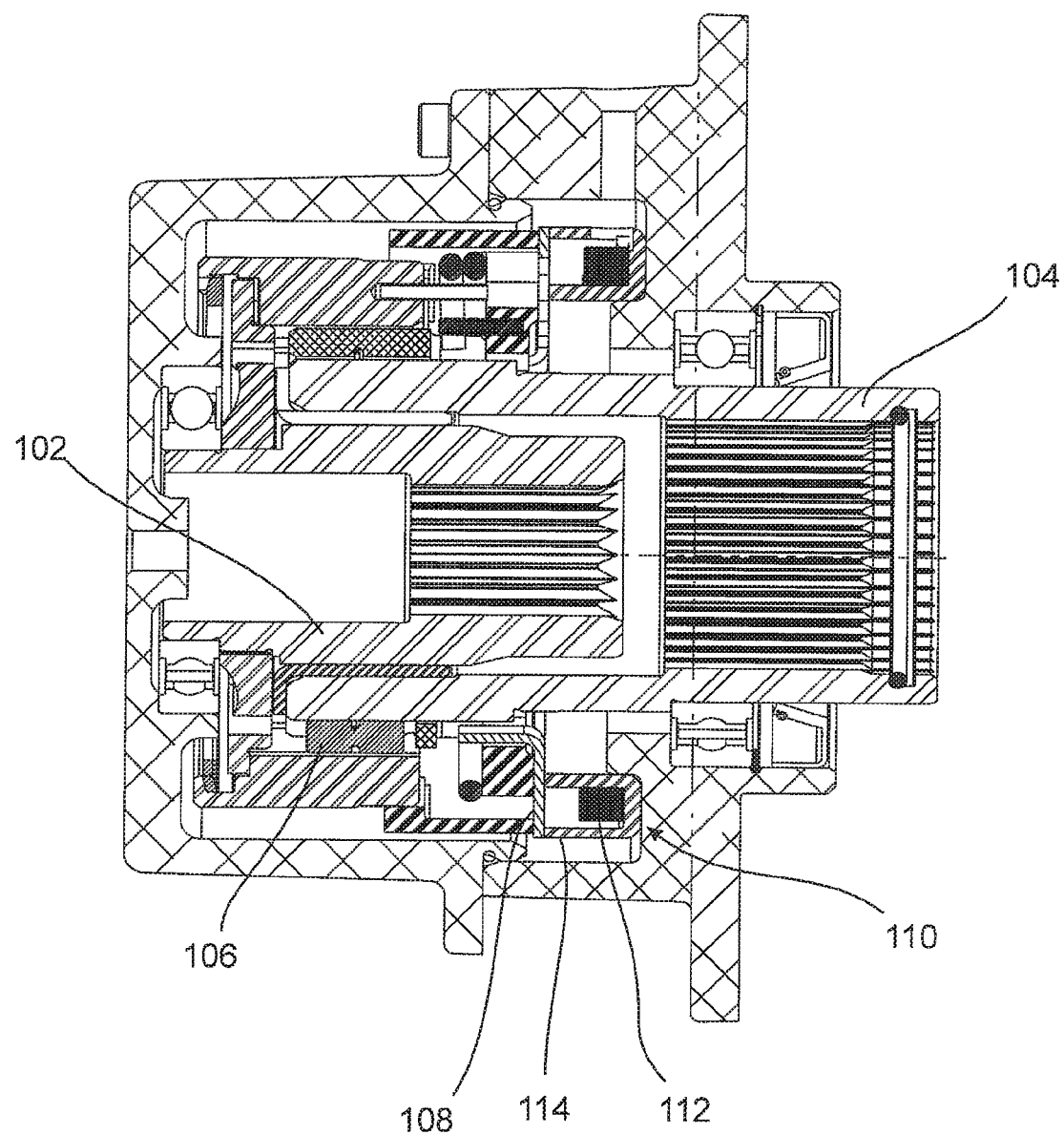
FIG. 9 is a section view of the clutch mechanism of FIG. 8 illustrating the location of the electromagnetic engagement device.

As shown in FIGS. 8 and 9, the present invention is not limited to use in a differential system but has applicability to any clutch mechanism that uses an electromagnetic engagement device, such as a coil, with an armature plate. FIG. 8 is an exploded view of a bidirectional coupling 100 that includes an input hub 102, which is connected to an input drive shaft (not shown), and an output hub 104, which is connected to an output shaft (not shown). A bidirectional overrunning clutch, such as a roller clutch 106, provides the torque transfer between the input and output hubs 102, 104. An electromagnetic engagement device 110 provides the control for shifting the bidirectional overrunning clutch 106 into and out of engagement. The electromagnetic engagement device 110 preferably includes a coil assembly with a coil 112 mounted within a coil pocket 114. An armature plate 108 according to the present invention is mounted in close proximity to the coil 112. Details of the clutch mechanism and bidirectional coupling are well known to those skilled in the art and can be found in, for example, U.S. Pat. Nos. 6,629,590, 6,622,837, 6,722,484, 9,022,195 and 9,856,930, the disclosures of which are all incorporated herein by reference in their entireties.

Figure 10:
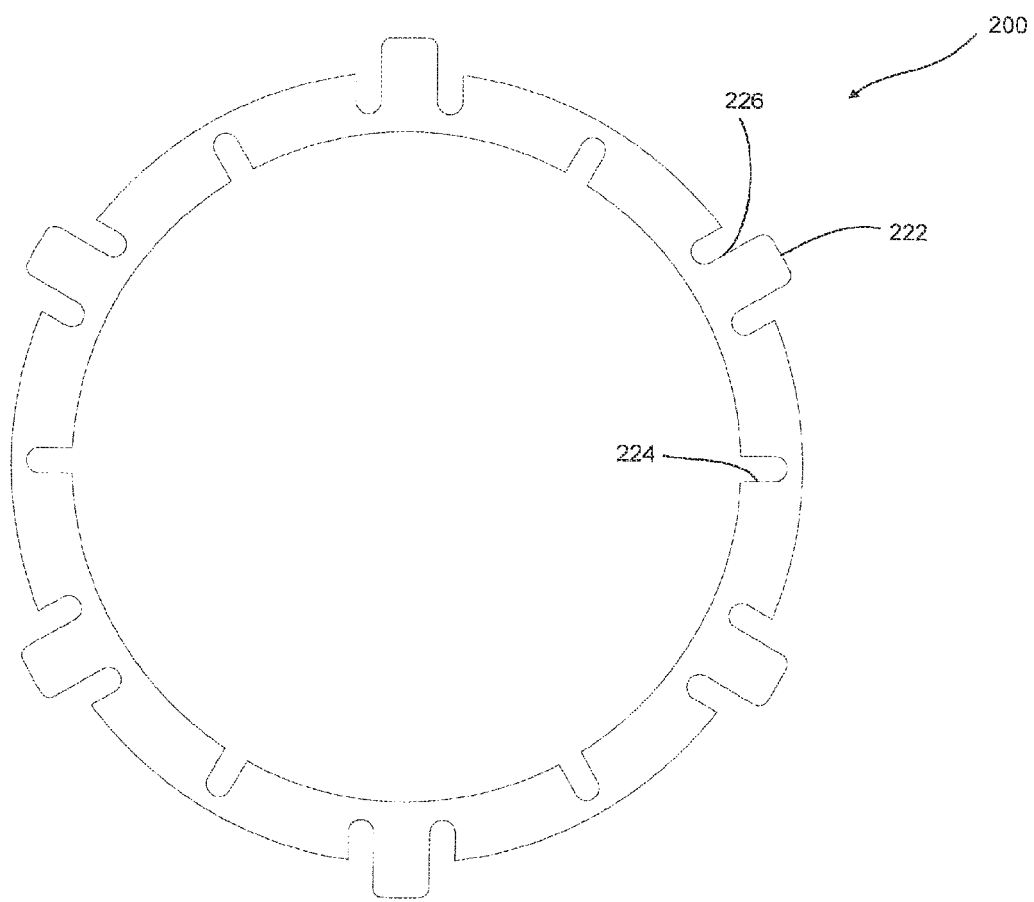
FIG. 10 is a front view of an armature plate according to another embodiment of the invention.

While the above embodiments have described the tangs as extending radially inward, it is also contemplated that the tangs could extend radially outward as shown FIG. 10. In this embodiment 200, the tangs 222 extend radially outward from the outer edge and the arrangement of the notches 222, 224 are reversed from the prior embodiment. That is, the outer notches 226 are located on either side of each tang 222, similar to the inner notches 24 on the prior embodiment. Likewise, the inner notches 224 in this embodiment are arranged similar to the outer notches 26 in the prior embodiment.

As used herein, the term "engage" is intended to both direct physical engagement through one or more components as well as operative engagement.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It should be understand that this disclosure specifically includes the language of the claims set forth below, and for any claim that depends from a preceding claim, this disclosure is also to be understood as including the disclosure of that claim as if it were depending from any other preceding claim, unless otherwise prohibited by the specific language of the claim.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. An electro-magnetic coil assembly mounted in a clutch assembly that includes a roll cage, the electromagnetic coil assembly comprising a coil mounted within an annular coil housing and a flexible armature plate free to rotate with respect to the coil, the coil assembly is adapted, when energized, to generate an electromagnetic field between the coil and the armature plate for attracting the armature plate to the coil assembly, the flexible armature plate comprising:
    an annular plate with an outer edge and an inner edge, the outer edge being spaced apart from the inner edge and defining a plate width therebetween, the outer edge defining an outer periphery, the inner edge defining an inner periphery;
    a plurality of tangs formed on and spaced about the inner periphery, the tangs extending from the inner edge away from the annular plate, the tangs engaging with the roll cage;
    a plurality of inner notches formed on and spaced about the inner periphery of the annular plate, at least two of the inner notches located between each set of adjacent tangs and extending radially outward from the inner edge toward the outer edge; and
    a plurality of outer notches formed on and spaced about the outer periphery of the annular plate, at least one of the outer notches located between each set of adjacent tangs and extending radially inward from the outer edge toward the inner edge
    wherein the notches create flexure points in the armature plate that permit the armature plate to flex so as to lie substantially flat against the face of the coil when the coil is activated.

2. The electro-magnetic coil assembly according to claim 1, wherein at least some of either the outer notches or the inner notches extend to a point at least halfway in the radial direction between the outer edge and the inner edge.

3. The electro-magnetic coil assembly according to claim 1, wherein the tangs extend radially inward from the inner edge.

4. The electro-magnetic coil assembly according to claim 1, wherein the tangs are spaced equidistant from each other.

5. The electro-magnetic coil assembly according to claim 1, wherein each inner notch is adjacent to a respective tang such that an edge of the tang defines a radial edge of the inner notch.

6. The electro-magnetic coil assembly according to claim 1, wherein the outer edge is substantially circular in shape.

7. The electro-magnetic coil assembly according to claim 1, wherein the inner edge is substantially circular in shape except where the tangs protrude radially inward, and wherein the inner notches extend radially outward at least about 50% of the radial plate width.

8. The electro-magnetic coil assembly according to claim 1, wherein the plurality of outer notches comprise six outer notches extending radially inward from the outer edge and spaced equidistant from one another.

9. The electro-magnetic coil assembly according to claim 8, wherein at least one outer notch is located equidistant between each set of adjacent tangs and equidistant between the at least two inner notches.

10. The electro-magnetic coil assembly according to claim 1, wherein the clutch assembly is a bi-directional overrunning clutch assembly for engaging driven shafts in a four wheel drive vehicle, the clutch assembly comprising:
   a differential housing including a differential case;
   a pinion input gear rotatably disposed within case and including a shaft extending out from the case and adapted to engage a drive shaft, the pinion input gear rotatable within the case;
   a ring gear located within the differential case and engaged with the pinion input gear such that rotation of the pinion input gear produces rotation of the ring gear;
   a bi-directional overrunning clutch housing formed on or attached to the ring gear such that rotation of the ring gear produces corresponding rotation of the clutch housing, the clutch housing having an internal diameter with a contoured surface,
   a pair of hubs substantially coaxially aligned with each other and located within the clutch housing, each hub adapted to engage an end of a driven shaft;
   a roll cage assembly located within the clutch housing and including a roll cage with two sets of rolls, each roll disposed within a slot formed in the roll cage, the rolls spaced around the circumference of the cage, and a plurality of springs for positioning the rolls in the slots, wherein one set of rolls is located between a portion of the contoured surface of the clutch housing and an outer surface of one hub, and the other set of rolls is located between a portion of the contoured surface of the clutch housing and an outer surface of the other hub; and
   an electromagnetic system for indexing the roll cage relative to the clutch housing, the electromagnetic system including the electro-magnetic coil assembly, wherein the tangs are coupled to the roll cage and wherein when the coil is activated, the armature plate causes the roll cage to index in a first direction relative to the clutch housing so as to index the roll cage into an active drive state where the rolls are positioned to cause the drive shaft to be coupled to the driven shafts when four wheel drive is needed.

11. The electro-magnetic coil assembly according to claim 1, wherein the clutch assembly is a bi-directional overrunning clutch mechanism for controlling torque transmission between an input shaft and at least one output hub, the clutch mechanism comprising:
   a mechanism housing;
   an input shaft having an end rotatably disposed within the mechanism housing;
   at least one output hub, at least a portion of the output hub being rotatably disposed within the mechanism housing, the hub having an outer surface;
   a clutch disposed within the mechanism housing and adapted to control torque transmission between the input shaft and the at least one output hub, the clutch including:
      a clutch housing engaged with the end of the input shaft in the mechanism housing so as to permit transmission of rotational motion from the input shaft to the clutch housing, the clutch housing having an inner surface with a cam surface formed thereon, the end of the hub being located radially inward from the cam surface, and
      a roll cage located between the cam surface and the end of the hub, the roll cage having a plurality of slots formed in and spaced circumferentially about the roll cage, each slot having a roll located therein, the cage being rotatable relative to the clutch housing and the end of the hub, the roll cage having a first position where the roll cage is positioned relative to the clutch housing such that a plurality of the rolls are not engaged with at least one of either the inner surface of the clutch housing or the outer surface of the hub so that substantially no torque can transfer from the clutch housing to the hub through the rolls, and a second position where the roll cage is positioned relative to the clutch housing such that a plurality of the rolls are engaged with the inner surface of the clutch housing and the outer surface of the hub so as to permit torque transfer between the clutch housing and the hub; and
   an engagement control assembly including:
      a drag mechanism which engages the roll cage to shift the roll cage into its second position, the drag mechanism including the electro-magnetic coil assembly for controllably rotating the roll cage relative to the clutch housing, the armature plate being engaged to the roll cage such that energizing of the coil assembly causes the armature plate to shift the roll cage; and
      a spring mounted to the clutch housing and engaged with the armature plate for biasing the roll cage into its first position,
      wherein the engagement control assembly includes an adapter disposed about at least a portion of the roll cage and engaged with the roll cage through the drag mechanism such that as the drag mechanism rotates the roll cage, it rotates the adapter, and wherein the one end of the spring is in biasing engagement with a portion of the adapter such that rotation of the roll cage and adapter stretches or compresses the spring such that the spring applies a biasing force against the adapter urging it to rotate in the opposite direction.

12. An electro-magnetic coil assembly mounted in a clutch assembly, the electromagnetic coil assembly comprising a coil mounted within an annular coil housing and a flexible armature plate, the coil assembly is adapted, when energized, to generate an electromagnetic field between the coil and the armature plate for attracting the armature plate to the coil assembly, the flexible armature plate comprising:

an annular plate with an outer edge and an inner edge, the outer edge being spaced apart from the inner edge and defining a plate width therebetween, the outer edge defining an outer periphery, the inner edge defining an inner periphery;

a plurality of tangs formed on and spaced about the inner periphery, the tangs extending from the inner edge away from the annular plate;

a plurality of inner notches formed on and spaced about the inner periphery of the annular plate, at least two of the inner notches located between each set of adjacent tangs and extending radially outward from the inner edge toward the outer edge; and a plurality of outer notches formed on and spaced about the outer periphery of the annular plate, at least one of the outer notches located between each set of adjacent tangs and extending radially inward from the outer edge toward the inner edge, wherein there is at least one outer notch located circumferentially equidistant between at least two inner notches.

13. An electro-magnetic coil assembly mounted in a clutch assembly, the electromagnetic coil assembly comprising a coil mounted within an annular coil housing and a flexible armature plate, the coil assembly is adapted, when energized, to generate an electromagnetic field between the coil and the armature plate for attracting the armature plate to the coil assembly, the flexible armature plate comprising:

an annular plate with an outer edge and an inner edge, the outer edge being spaced apart from the inner edge and defining a plate width therebetween, the outer edge defining an outer periphery, the inner edge defining an inner periphery;

a plurality of tangs formed on and spaced about the outer periphery, the tangs extending from the outer edge away from the annular plate;

a plurality of outer notches formed on and spaced about the outer periphery of the annular plate, at least two of the outer notches located between each set of adjacent tangs and extending radially inward from the outer edge toward the inner edge; and a plurality of inner notches formed on and spaced about the inner periphery of the annular plate, at least one of the inner notches located between each set of adjacent tangs and extending radially outward from the inner edge toward the outer edge.

14. The electro-magnetic coil assembly according to claim 13, wherein at least some of either the outer notches or the inner notches extend to a point at least halfway in the radial direction between the outer edge and the inner edge.

15. The electro-magnetic coil assembly according to claim 13, wherein the wherein the tangs extend radially outward from the outer edge.

16. The electro-magnetic coil assembly according to claim 13, wherein the tangs are spaced equidistant from each other.

17. The electro-magnetic coil assembly according to claim 13, wherein each outer notch is adjacent to a respective tang such that an edge of the tang defines a radial edge of the outer notch.

18. The electro-magnetic coil assembly according to claim 13, wherein the inner edge is substantially circular in shape.

19. The electro-magnetic coil assembly according to claim 13, wherein the outer edge is substantially circular in shape except where the tangs protrude radially outward, and wherein the outer notches extend radially inward at least about 50% of the radial plate width.

20. The electro-magnetic coil assembly according to claim 13, wherein the at least one inner notch is located equidistant between two outer notches.

21. The electro-magnetic coil assembly according to claim 20, wherein there is one inner notch located equidistant between each set of adjacent tangs and wherein the inner notch extends radially outward from the inner edge.

22. The electro-magnetic coil assembly according to claim 21, wherein the inner notch extends radially outward from the inner edge at least 50% of the radial width.

23. The electro-magnetic coil assembly according to claim 13 wherein the clutch assembly is a bi-directional overrunning clutch assembly for engaging driven shafts in a four wheel drive vehicle, the clutch assembly comprising:

a differential housing including a differential case;

a pinion input gear rotatably disposed within the case and including a shaft extending out from the case and adapted to engage a drive shaft, the pinion input gear rotatable within the case;

a ring gear located within the differential case and engaged with the pinion input gear such that rotation of the pinion input gear produces rotation of the ring gear;

the clutch housing formed on or attached to the ring gear such that rotation of the ring gear produces corresponding rotation of the clutch housing, the clutch housing having an internal diameter with a contoured surface, a pair of hubs substantially coaxially aligned with each other and located within the clutch housing, each hub adapted to engage an end of a driven shaft;

a roll cage assembly located within the clutch housing and including a roll cage with two sets of rolls, each roll disposed within a slot formed in the roll cage, the rolls spaced around the circumference of the cage, and a plurality of springs for positioning the rolls in the slots, wherein one set of rolls is located between a portion of the contoured surface of the clutch housing and an outer surface of one hub, and the other set of rolls is located between a portion of the contoured surface of the clutch housing and an outer surface of the other hub; and an electromagnetic system for indexing the roll cage relative to the clutch housing, the electromagnetic system including the electro-magnetic coil assembly, wherein the tangs are engaged with the roll cage and wherein when the coil is activated, the armature plate causes the roll cage to index in a first direction relative to the clutch housing so as to index the roll cage into an active drive state where the rolls are positioned to cause the drive shaft to be coupled to the driven shafts when four wheel drive is needed.

24. The electro-magnetic coil assembly according to claim 13, wherein the clutch assembly is a bi-directional overrunning clutch mechanism for controlling torque transmission between an input shaft and at least one output hub, the clutch mechanism comprising:

a mechanism housing;

an input shaft having an end rotatably disposed within the mechanism housing;

at least one output hub, at least a portion of the output hub being rotatably disposed within the mechanism housing, the hub having an outer surface;

a clutch disposed within the mechanism housing and adapted to control torque transmission between the input shaft and the at least one output hub, the clutch including:

the clutch housing, wherein the clutch housing is engaged with the end of the input shaft in the mechanism housing so as to permit transmission of rotational motion from the input shaft to the clutch housing, the clutch housing having an inner surface with a cam surface formed thereon, the end of the hub being located radially inward from the cam surface, and a roll cage located between the cam surface and the end of the hub, the roll cage having a plurality of slots formed in and spaced circumferentially about the roll cage, each slot having a roll located therein, the cage being rotatable relative to the clutch housing and the end of the hub, the roll cage having a first position where the roll cage is positioned relative to the clutch housing such that a plurality of the rolls are not engaged with at least one of either the inner surface of the clutch housing or the outer surface of the hub so that substantially no torque can transfer from the clutch housing to the hub through the rolls, and a second position where the roll cage is positioned relative to the clutch housing such that a plurality of the rolls are engaged with the inner surface of the clutch housing and the outer surface of the hub so as to permit torque transfer between the clutch housing and the hub; and an engagement control assembly including:

a drag mechanism which engages the roll cage to shift the roll cage into its second position, the drag mechanism including the electro-magnetic coil assembly for controllably rotating the roll cage relative to the clutch housing, the armature plate being engaged to the roll cage such that energizing of the coil assembly causes the armature plate to shift the roll cage; and a spring mounted to the clutch housing and engaged with the armature plate for biasing the roll cage into its first position, wherein the engagement control assembly includes an adapter disposed about at least a portion of the roll cage and engaged with the roll cage through the drag mechanism such that as the drag mechanism rotates the roll cage, it rotates the adapter, and wherein the one end of the spring is in biasing engagement with a portion of the adapter such that rotation of the roll cage and adapter stretches or compresses the spring such that the spring applies a biasing force against the adapter urging it to rotate in the opposite direction.

\* \* \* \* \*